Patented May 27, 1924.

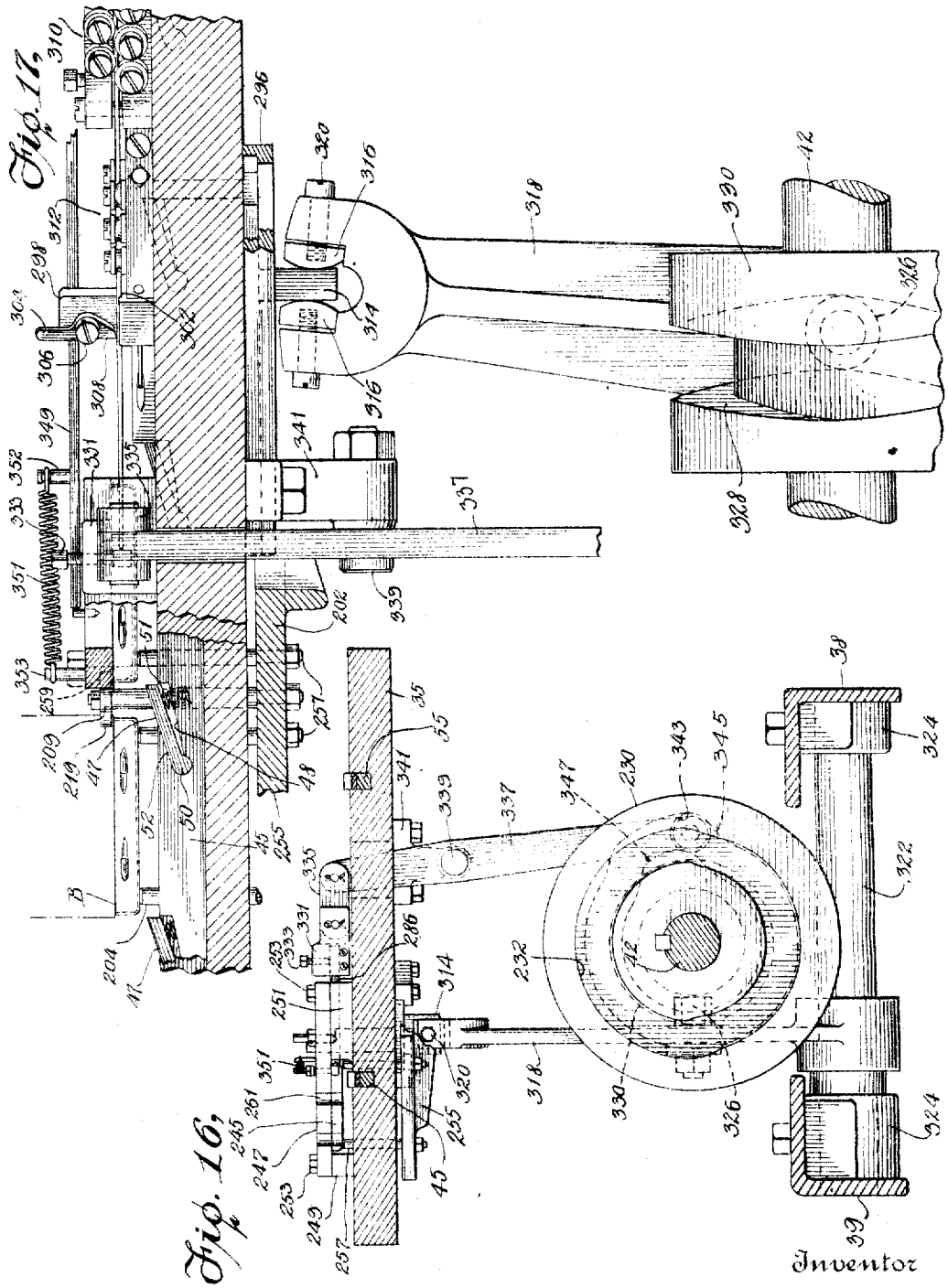

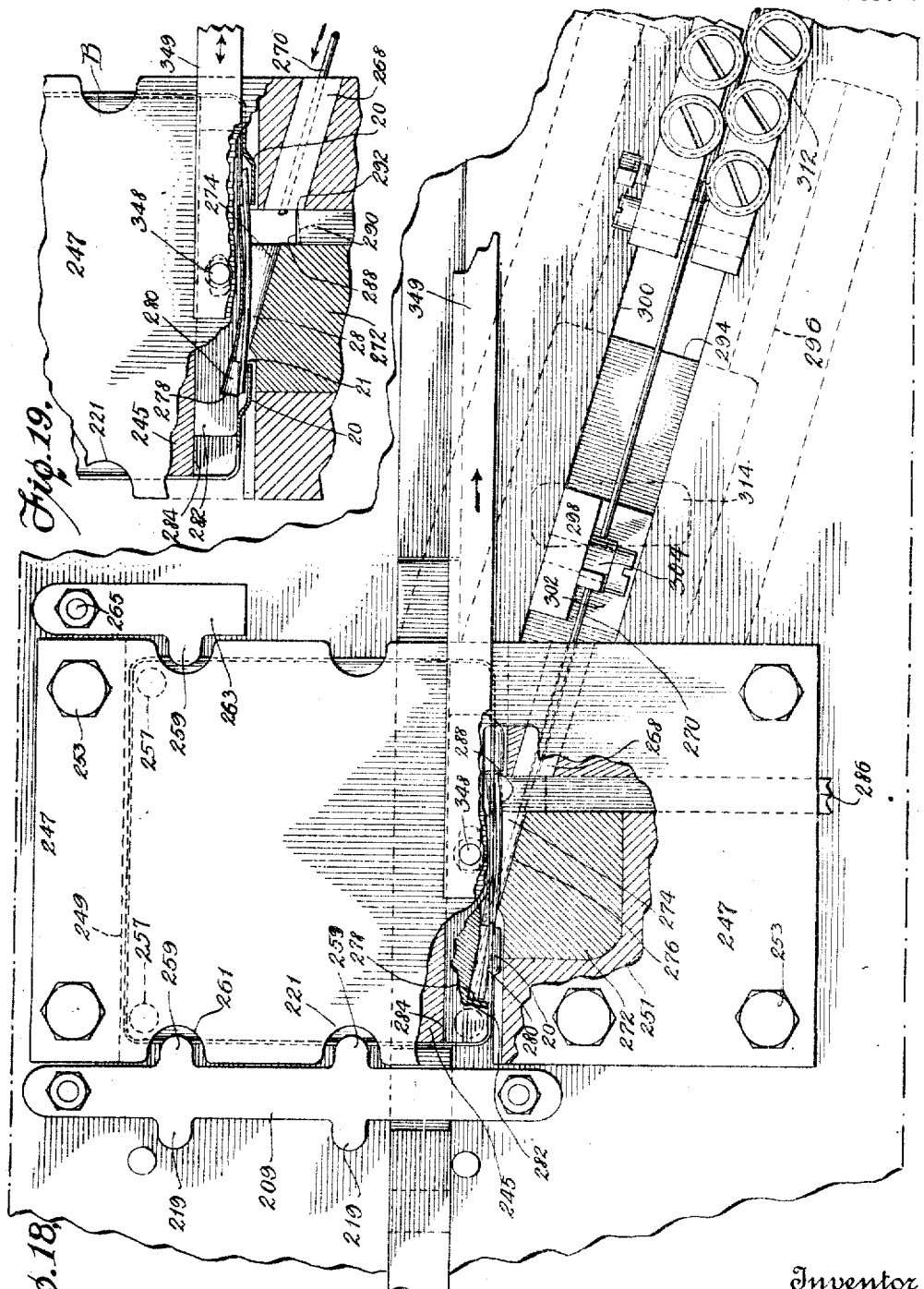

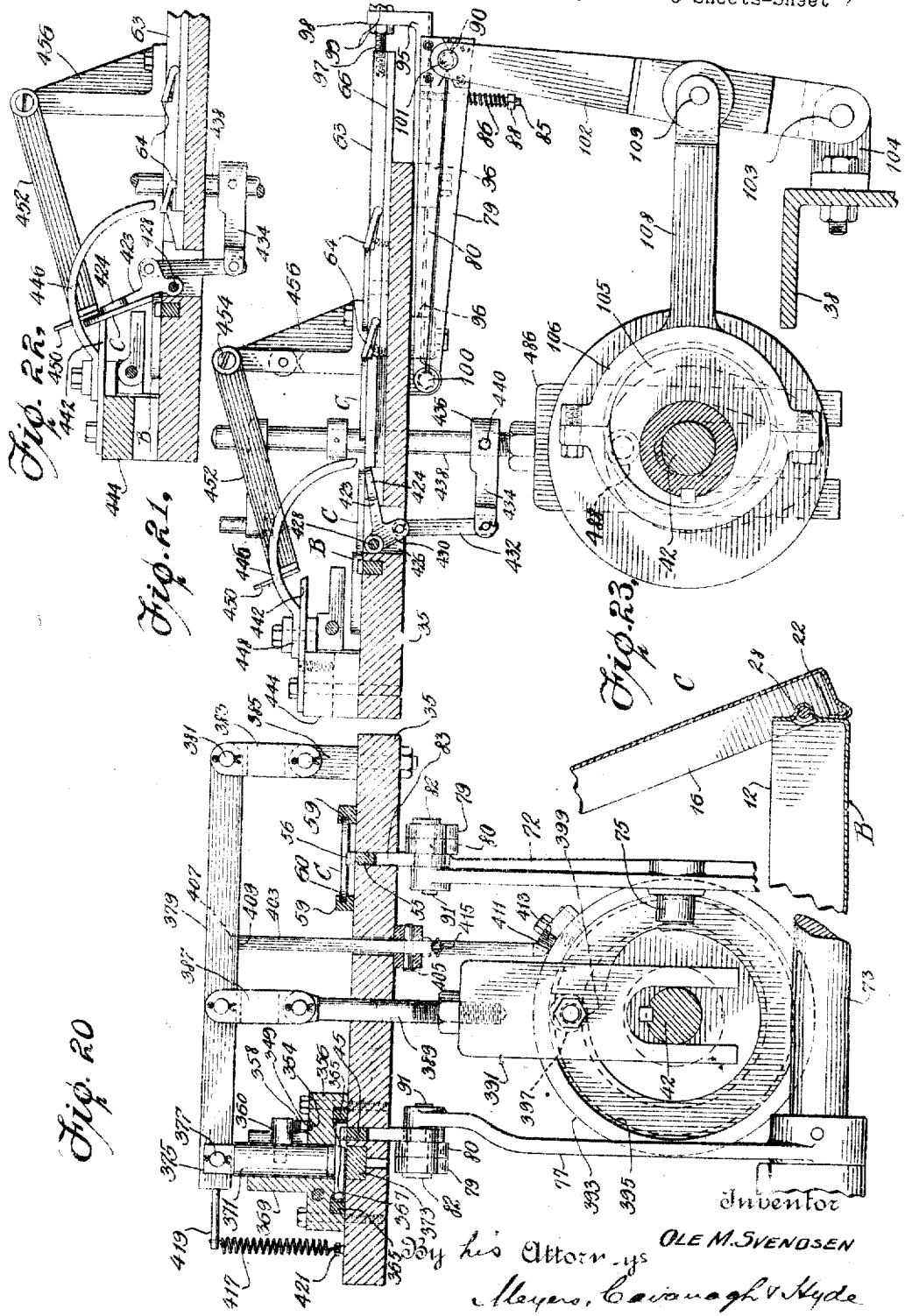

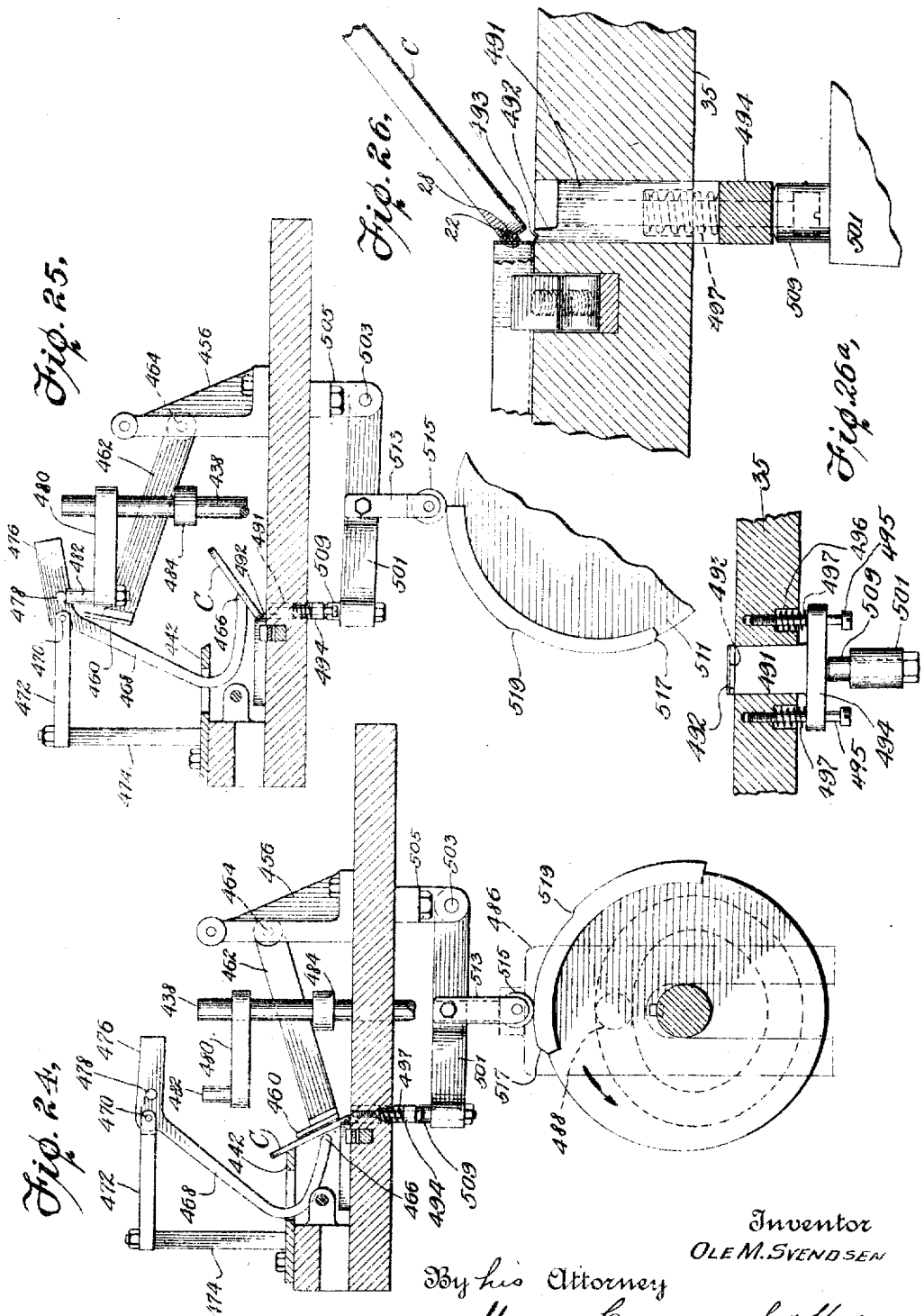

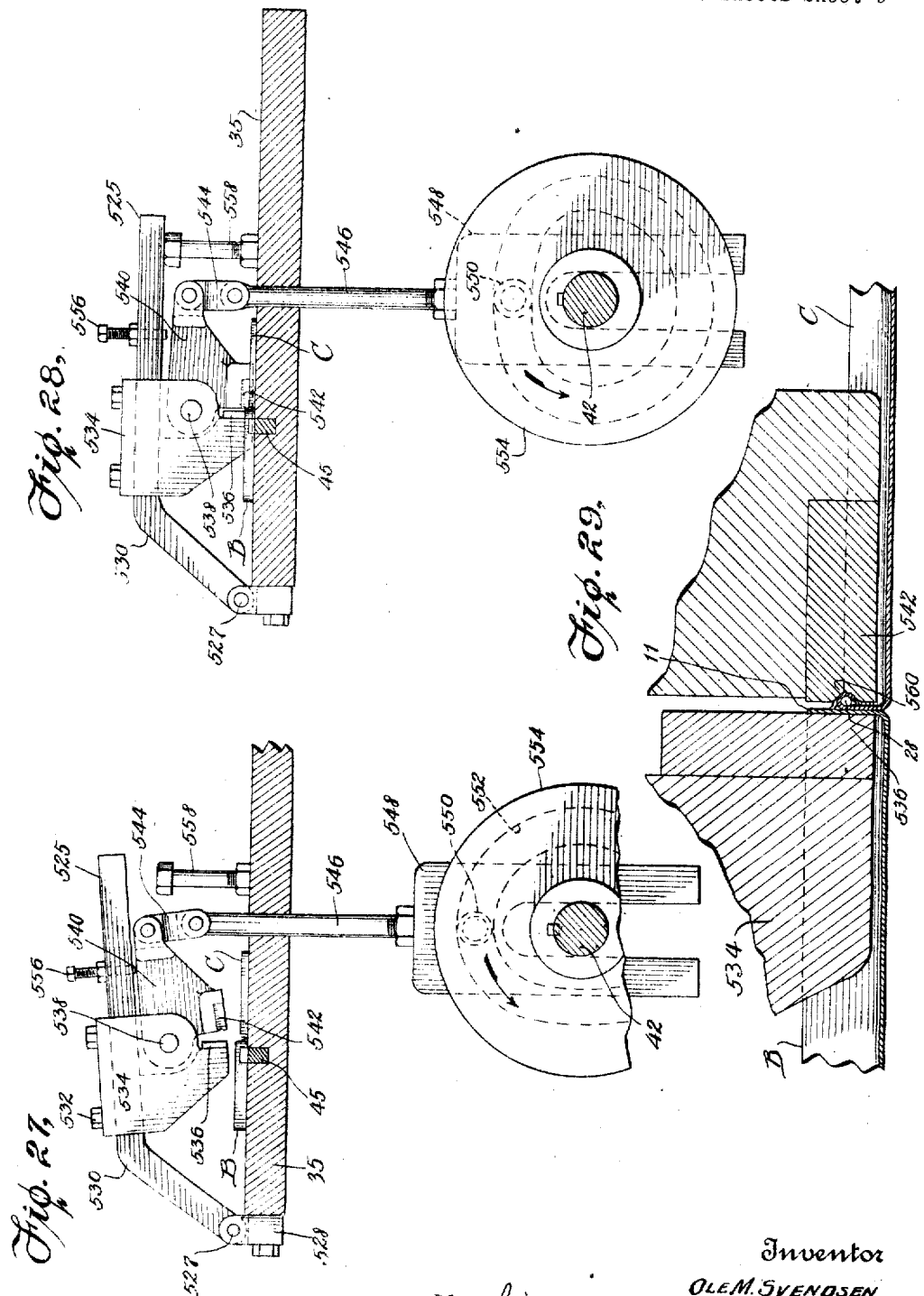

1,495,455

UNITED STATES PATENT OFFICE.

OLE M. SVENDSEN, OF BALTIMORE, MARYLAND, ASSIGNOR TO FEDERAL TIN COMPANY, INC., OF BALTIMORE, MARYLAND, A CORPORATION OF NEW YORK.

MACHINE FOR PREPARING AND ASSEMBLING HINGED-BOX PARTS.

Application filed November 19, 1920. Serial No. 425,090.

*To all whom it may concern:*

Be it known that I, OLE M. SVENDSEN, a citizen of the United States, and resident of Baltimore, State of Maryland, have invented certain new and useful Improvements in Machines for Preparing and Assembling Hinged-Box Parts, of which the following is a specification.

My invention relates to machines for forming hinge members on complemental box-part blanks, and for assembling the box parts to produce a complete, hinged box structure.

More particularly the invention relates to a machine adapted to attach separate hinge pintles to box-parts, such as box bodies, to concurrently form complemental hinge members in complemental box parts, such as covers, to bring the box parts together and assemble the hinge parts, and to complete the assembly by bending the cover hinge members about the pintles.

The word "form" or "forming" as used herein, and especially in the claims, in the broader sense, includes the provision or shaping on the respective box parts of the respective hinge members, for instance, the punching of the hinge eyes in the box bodies and the bending or shaping of the hinge hooks on the covers.

The general object of the invention is to provide a machine of simple, durable and economical construction, capable of performing the described operations rapidly and economically and, preferably, entirely automatically.

Another object is to provide means for forming ventilating openings in box parts, and especially to advantageously co-ordinate such means, when included in the complete machine, with instrumentalities for performing other operations.

A further object is to provide means, which may be included when desired, for removing the burrs formed on the box parts in the formation of the ventilating openings.

Another object is to provide various improvements in machines of this class, sufficiently specified hereinafter.

To attain these and other objects, the invention as embodied in a preferred form desirably comprises combined instrumentalities for advancing blanks (or partly formed box parts) to different work positions, forming hinge ears in certain parts, such as box bodies, inserting pintles in the hinge ears, forming complemental hinge members on complemental box parts, such as covers, bringing the complemental box parts together, and connecting the hinge members to form complete boxes.

In a preferred embodiment, also, the feed mechanism is improved and simplified and is related to mechanisms which operate upon the box parts so that special registering or "stopping" mechanism to locate the parts in different work positions in eliminated. Preferably also the box parts are advanced through stationary channels and at certain points where it is necessary to place the parts on special holding devices, such as mandrels, for the performance of certain operations, means are provided for placing the box parts on the mandrels by moving the parts laterally from their normal course of movement, and more particularly this is done in the present embodiment by lifting pins. This eliminates relatively complicated mechanism employed in other machines for similar purposes.

Simplified means are also preferably provided, operated by movement of hinge part forming dies, for releasing the box parts from the fixed dies or mandrels, this mechanism replacing more complicated devices usually provided in other machines for a similar purpose.

Preferably also the wire used for hinge pintles forming a part of the hinge member of one of the box parts is fed by simple ratchet devices, which insures the delivery of the proper length of wire to form a pintle at each operation without regard to other varying conditions. This eliminates relatively complicated mechanism employed in other machines for a similar purpose, for instance, mechanism in which wire is fed from friction rolls and the length of wire fed for each pintle is governed partly by the diameter of the rolls and the number of revolutions thereof.

Preferably also simplified and improved means are provided for substantially simultaneously cutting and registering the wire pintle in relation to the box part in which it is to be inserted, this mechanism replacing more complicated devices used in other machines for a similar purpose, for instance devices which require separate means for cutting off the pintles and for registering them in relation to the box parts.

The invention also comprises instrumentalities for attaining other objects, mentioned above and hereinafter.

Certain of the instrumentalities or sub-combinations of the complete organization embody improvements, and have utility, in themselves, apart from other parts of the organization; also variations may be made in structure and arrangement of the general organization, parts and sub-combinations of parts, within the principles of the invention, too numerous to point out at length, and, therefore, only a few of the possible variations will be mentioned.

The accompanying drawings show a machine embodying the invention in one form.

Fig. 1 is a side elevation;

Fig. 2 is a top plan;

Figs. 3 to 8, inclusive, are perspective views of box parts in their original conditions and after different successive operations have been performed upon them, the arrangement of the figures also showing the relative progress of different parts of one complete box through the machine;

Figs. 9, 10 and 11 are sectional views showing the hinge members of two complemental box parts brought together, with the box parts in different relative positions in the progress of assembly, and finally with the hinge members completely formed, and the box parts permanently connected together;

Fig. 12 is a vertical section at 12—12, Fig. 2, showing mechanism for punching ventilating openings;

Fig. 13 is a vertical section at 13—13, Fig. 2, showing hinge part forming dies and operating mechanism;

Figs. 14 and 15 are enlarged sections of hinge part forming dies and certain adjacent parts;

Fig. 16 is a vertical section at 16—16, Fig. 2, showing principally mechanism for inserting and cutting off hinge pintles;

Fig. 17 is an enlarged vertical section in a longitudinal plane of the machine, showing principally pintle inserting mechanism;

Fig. 18 is an enlarged top plan of the pintle inserting mechanism, with some parts broken away;

Fig. 19 is a detail on similar scale, showing the pintle inserting mechanism in a different position;

Fig. 20 is a vertical section at 20—20, Fig. 2, showing mechanism for smoothing down burrs about the ventilating openings; also parts of the longitudinal feed mechanism and parts of the pintle inserting mechanism;

Fig. 21 is a vertical section at 21—21, Fig. 2, showing transverse feed mechanism for successive feeding of similar box parts (specifically box tops or covers in this embodiment); also mechanism for commencing the operation of engaging complemental hinge members with each other;

Fig. 22 is a similar section including only the left hand part of Fig. 21, showing the hinge connecting mechanism in a different position;

Fig. 23 is an enlarged section of portions of the box parts showing one of the cover positions in the operation of hinge connection;

Fig. 24 is a vertical section at 24—24, Fig. 2, showing additional parts of hinge engaging mechanism;

Fig. 25 is a similar view showing the parts in a different position;

Fig. 26 is an enlarged detail of Fig. 25 showing particularly a box part supporting plunger;

Fig. 26ª is a sectional detail of the supporting or elevating plunger.

Figs. 27 and 28 are vertical sections at 27—27, Fig. 2, showing hinge clinching or hinge assembly finishing mechanism in two different positions; and Fig. 29 is an enlarged section of the hinge clinching dies of Figs. 27 and 28.

*Box-part and hinge structures.*

Figs. 3 to 11, inclusive, show box parts of typical forms as supplied to the machine, and in approximately the relative positions they occupy in their progress through the machine, in the embodiment here shown, with the hinge parts in different successive stages of formation, and then in different stages of the connecting operation, and finally the completely assembled box with the hinge parts permanently connected together. These figures also show ventilating openings formed in certain of the box parts by the operation of the machine and a match scratching surface, which may also be formed as an incidental operation.

Fig. 3 shows a box part B, specifically a body or bottom section of a box, usually of rectangular form, of sheet metal, having a "bottom" 10, two opposite shallow sides 11 and two other opposite shallow sides 12, which may be called "ends" for descriptive purposes, when it is necessary to differentiate them from the sides 11. The sides, ends and bottom thus constitute a shallow rectangular box section which is easily produced by stamping and pressing operations. To facilitate the formation of hinge members of a certain sort, one of the sides 11 may be provided with shallow edge extensions 13. Fig. 5 shows a box section C, which is of generally similar form to section B, having a bottom 14, shallow sides 15 and ends 16, so called for descriptive convenience. This box section is intended in this case, to be the top or cover of the completed box. Evidently the terms "top" and "bottom" or "body", as applied to the box sections are of only relative significance; also the term "bottom" as applied to the main portion 10 of box part B or the main portion 14 of box part C, is used for descriptive convenience, since the part 14 of box part C is really the top of the completed box, as ordinarily labeled and arranged for sale. One of the side portions of cover part C is preferably formed with a rudimentary or embryo hinge portion, such as the tongue 17, which has a straight edge projecting somewhat above the normal outline of the edges of the sides and ends 15—16. At each side of this projection or tongue is usually provided a depression or notch 18 in the side 15. These notches accommodate the particular kind of hinge ears formed on the other box part.

For structural and operative convenience two complemental box parts are desirably advanced through the machine contemporaneously or in substantially opposite relation. Omitting reference to Fig. 4 temporarily, the two box parts are desirably advanced to parallel work positions, exemplified by the positions of the box parts in Figs. 6 and 7. At this work position box part B is acted on by suitable devices, such as cutting and pressing dies, to produce pintle ears 20 of part-cylindrical outline with confronting openings 21 to receive a wire pintle. In this operation, extensions 13 of Fig. 4 are drawn down and substantially disappear. Box part C is acted upon by bending dies to bend over the upper part of the rudimentary hinge member 17 forming a part 22 which may be identified as a hook member of the hinge part. A curved or part-cylindrical bend 23 is also preferably formed at the same time in hinge member 17 intermediate the hook portion 22 and the remaining straight portion 24 of the side 15, this bend being adapted to accommodate the hinge pintle of the other box part.

A match scratching surface, consisting of a row of corrugations 25 may be formed on side wall 11 of box part B, conveniently by the same dies that form the hinge ears 20.

A hinge pintle 28 is inserted in ears 20 of box part B and usually this is done by suitable instrumentalities at another work position of the box part represented in Fig. 8. During the movement of box part B to this work position, part C may be moved a suitable distance without any work being performed upon it, to keep step with box part B; and the box parts are then brought together, usually at another work position than the one in which the pintle is inserted in part B. This associating movement of the box parts may conveniently consist in moving part C laterally while part B does not depart from its normal line of progress, although evidently, the relative movements of the parts may be reversed. The two parts, therefore, are brought into close proximity, as shown in Fig. 8, usually at a work position beyond the one at which the pintle was inserted. Box part C is then tilted as in Fig. 9 and hook 22 is inserted between pintle 28 and side 11 of the box body and the cover then caused or permitted to fall back to about the position shown in Fig. 10, thus completing the insertion of the hook and locating hinge bend 23 properly about the pintle. By suitable forming dies the hook portion 22 is then bent completely around the pintle forming a substantially closed hinge eye 29 and completing the hinge assembly of the box parts as shown in Fig. 11. The completed box may then be delivered from the machine in open condition as shown in Fig. 11. The exact method of manipulating the box parts may be varied greatly.

It is desirable to provide ventilating openings when the boxes are to be used for certain commodities, such as tobacco. My invention provides for conveniently forming these openings when desired. Fig. 4 shows ventilating holes 30 of suitable number and arrangement cut in bottom 10 of box part B. This may be done by a suitable punch mechanism and this mechanism may conveniently be located at a work position in advance of the position in which the formation of the hinge parts is commenced, such as the work position represented by Fig. 4. The punches which produce the holes usually leave burrs about the holes and means are, therefore, usually provided for stamping down these burrs and this operation is most conveniently performed at another work position, usually somewhere between the position at which the formation of hinge parts on box part B is completed and the position at which the assembly of the box parts is commenced, and also conveniently the burr stamping mechanism may be associated with parts which perform other essential operations, such for example as part of the pintle inserting mechanism. Evidently the ventilating holes may be formed in the other box part, or in both parts if necessary.

A machine chosen as the embodiment of the invention, comprising instrumentalities for forming and assembling box parts in the general manner above explained, will now be described.

*General organization, and conveyors.*

A top plate or table 35 (Figs. 1 and 2) is supported on suitable legs 36. The legs support longitudinal frame members 38, 39 (see Fig. 16) and bearings 41 in which drive shaft 42 is revolubly mounted. Table 35 is broken away at the left, which is the initial or feed end of the machine, indicating that the machine may be provided with suitable means for automatically feeding box parts to it or that the machine may in fact be a continuation of another machine or machines for initially forming the box parts as indicated in Figs. 3 and 5; although, of course, the machine may be entirely independent, and box parts may be supplied to it by hand or otherwise. The machine, in the present embodiment, is arranged so that box parts of one kind, such as bodies B, progress in an evenly spaced line near one side of the table and the other parts C progress in an evenly spaced line near the other side of the table to a point between section lines 21 and 24, Fig. 2, where parts C are fed laterally into association with parts B, and thereafter the pairs of box parts are advanced together to the delivery end of the machine, at the right, the assembly of the parts being completed between these points. From the feed end to the lateral feed position a box part in each row is kept opposite a complemental part in the other row. For the sake of simplicity and accuracy in feeding the box parts and locating them with respect to devices that act on them at the different work positions, it is preferred to advance the parts step by step with a rest of suitable duration at each work position, and usually also incidentally at some intermediate positions where no operations are performed on the parts, due to exigencies of organization of the complete machine. Therefore, to feed a row of bodies B a feed bar 45 is arranged to reciprocate in a channel provided in the table. This bar is provided at equal intervals (see Fig. 17) with feed pawls 47 located in spaces 48 formed in the bar. Each pawl has a part-cylindrical end 50 located in a socket of similar form providing a pivotal mounting for the pawl, and a spring 51 located in a suitable socket in the bar urges the pawl upward so that its free end normally lies considerably above the upper surface of the bar (which is flush with the table) and is in a position to engage the rear ends 12 of the box bodies. The upward movement of the pawls is limited by engagement with the upper walls 52 of the pawl spaces in the feed bar.

A similar feed bar 55 for box parts C, provided with similar pawls 56, is reciprocably mounted in a channel in the table, parallel to the first bar, and the pawls on the two feed bars are opposite so that they engage and feed the box parts in parallel paired relation, as clearly understood from Fig. 2. The box parts in each row are guided against lateral movement and at certain points against improper vertical movement, by suitable means sufficiently exemplified by guide strips 59 for parts C (Figs. 1, 2 and 20). These guide strips have channels 60 accommodating the sides of the box parts and the upper flanges of the channels may be omitted at certain points, and the guide strips may also be omitted at certain places to properly accommodate the guide means to the form of the box parts and permit necessary movements of the box parts as sufficiently understood hereafter. The short sections of guide strips 59 for box parts C shown in Fig. 2, indicate sufficiently the provision of suitable guide means, at proper places, for this row of parts, and it should be understood that similar guides are provided at proper places, for the row of box parts B, the showing of these guides being generally omitted to avoid obscuring other parts of the mechanism.

Feed bar 55 for cover parts C extends from the feed end of the machine to a point near section line 21—Fig. 2, and at that point a lateral feed bar 63 for cover parts C is arranged to reciprocate in a transverse channel in table 35. This feed bar is substantially similar to the others and is provided with similar pawls 64 (see also Fig. 21) and these pawls are spaced equally apart a suitable distance with due regard to the width of the box parts and the necessary distance of travel at each feed movement. Any or all of the feed bars may be provided as shown in connection with the feed bar 63 with lateral base flanges 66, co-operating with strips or gibs 67, screwed to the table to properly locate and guide the feed bar and permit its easy implacement and removal. These details are omitted from the showing of feed bars 45 and 55 for the sake of clearness.

Feed bars 45 and 55 are moved simultaneously to and fro by the following means: Drive shaft 42 carries a cam 70 having a peripheral channel 71. A rock arm 72 is mounted on a transverse shaft 73, mounted in suitable bearings on frame bars 38 and 39. This rock arm has a cam follower 75 located in cam groove 71. Transverse shaft 73 also carries another rock arm 77, parallel to arm 72 and both the arms are fixed to move with the shaft. The upper ends of each of arms 72 and 77 are connected, the one to feed bar 55 and the other to feed bar 45, by similar linkages, only one of which will be described. This comprises two link members 79 and 80 pivotally connected on a stud 82 located on a block 83 secured to the lower side of the feed bar, in this instance, bar 55. The two link members are urged together by a rod 85 connected to link member 80 and a spring 86 carried by the rod and compressed between adjustable nuts 88 on the rod and the lower face of link member 79. The confronting faces of the link members are provided with sockets 90 of part-cylindrical form embracing a pin 91 carried by the upper end of rock arm 72.

Similar reference characters identify the similar linkage provided for rock arm 77 and feed bar 45. As main shaft 42 rotates continuously, cam groove 71 oscillates rock arm 72 and through shaft 73 rock arm 77 oscillates synchronously and the two link connections reciprocate the two feed bars. At each return movement of the feed bars their initial pawls 47 and 55, engage the rear ends of a box part, B and C, respectively, and in the right hand (feed) movement of the rock arms the box parts are advanced one step; at the next return movement of the rock arms and feed bars, if the box parts are at that time held down by their guides, each pawl which was next in advance of the respective box parts, is depressed by contact with the forward end of that part and slides under the box part until at the end of the return movement each last mentioned pawl snaps up into engagement with the rear end of the box part and is ready to feed it forward another step at the next feed movement of the bar. The cam contour is such that the box parts are permitted to remain stationary at each work position long enough for the proper operations to be performed upon it at that point, this rest of the box parts being, of course, the same at each station. Since the feed movement of both rows of box parts is controlled by a single cam, it is only necessary to use ordinary care in properly spacing the driving pawls and equalizing the link connections to insure equal movement of the parts in each row, and, of course, the movement of the box parts from each position to the next is perfectly uniform. No special devices are needed to arrest movement of the box parts as they reach each work position, and the feed and registry mechanism is thus greatly simplified; in fact registry mechanism for the box parts is practically eliminated.

The two-part link construction described provides a yielding connection between the feed driving mechanism and the feed bars, so that if for example, the movement of either feed bar is obscured by a box part jamming in its guides or in any of the devices which act upon it, pin 91 of the corresponding rock arm will pull out from between the sockets 90 of links 79 and 80 and the link will drop down free from the rock arm, and further feed movements of the rock arm are idle until the obstruction can be removed and the link connection restored by springing apart link members 79 and 80 and reinserting pin 90 between the sockets.

Transverse feed bar 63 is driven in a similar way by somewhat differently arranged mechanism including a two-part link similar to the ones just described and identified by similar reference characters (see Figs. 1, 2 and 21). A slide 95 is arranged beneath the table parallel to feed bar 63, and held by suitable guides 96. The outer end of this slide is connected to the feed bar by a screw 97 seated in the end of the bar and passing through a bracket 98 extending up at the outer end of the slide. Nuts 99 located at opposite sides of the bracket permit the position of the feed bar to be adjusted in relation to the slide and thus in relation to the operating means, so that the feed pawls of the bar may be brought into proper position with relation to box parts C delivered at the rear end of longitudinal conveyor 55. The inner end of two-part link 79—80 is pivotally connected at 100 to the inner end of slide 95 and the sockets 90 of the links engage a pin 101 on the upper end of a rock arm 102 fulcrumed at 103 on a bracket 104 secured to one of the longitudinal frame members. The sockets 90 are carried by blocks 90ª secured to the sides of the link members 79 and 80. Drive shaft 42 has an eccentric 105 operating on eccentric strap 106 and link 108, the end of which is pivoted at 109 to rock arm 102. The eccentric is arranged so that the feed stroke of the rock arms commences at the end of the dwell of the box parts, that is at substantially the same instant as the commencement of feed movement of the other feed bars, and the feed stroke of bar 63 stops at about the time that the feed movement of the other bars is completed or sufficiently soon thereafter to bring the box cover part at the delivery end of bar 63 into association with the box body delivered to that work position at about the same time, and sufficiently soon to permit the necessary operations to be performed upon the box at that point before the next feed movement. It is now apparent that feed bars 45 and 55 are spaced apart a distance corresponding to the spaces required for a definite number of box part locations on the transverse conveyor 63, that is in the present instance, two box part locations, between the longitudinal conveyors so that at each feed stroke of the lateral conveyor it takes a box cover part delivered by longitudinal feed bar 55 and moves it one step toward feed bar 45 and at the next feed movement delivers this box part to desired proximity to the box body part delivered to that work position by feed bar 45.

*Ventilator punching apparatus.*

It is convenient in some cases, as exemplified in the present embodiment, to punch the ventilating openings 30 (Fig. 4) at the first work position of box bodies B, that is, the position substantially between section lines 12 and 13, Fig. 2. When the punching is provided for at this point, the complemental box parts C opposite this work position are idle; that is, no operations are performed upon them, although an opportunity is afforded for performing suitable operations upon these parts when in this position. To give one example, these parts might also be perforated to provide additional ventilating openings by a substantial duplication of the punching mechanism now to be described.

A frame member 115 is secured on the table and conveniently this is in the form of a yoke bridging the path of movement of box parts B (see Figs. 1, 2 and 12). A punch plunger 116 reciprocates in a suitable socket in the top of the yoke and carries a slide 118 flanged at the sides to engage ways provided on the sides of the yoke. The slide carries a punch head 120 provided with punches 121 of suitable number and arrangement to produce the hole-pattern desired, as exemplified in Fig. 4, and the punch head also carries a plate 123 perforated to accommodate the punches and urged down by springs 124 surrounding plungers 126 movable in suitable holes 127, provided in the punch head. Table 35 is suitably recessed to receive a punch die 128 having suitable holes to receive the punches and the table is provided with suitable apertures below the die to discharge the punchings. Further details may be as usual in punching apparatus and need not be explained. Drive shaft 42 carries a cam 130 having on one face a cam groove 131. Adjacent to the cam is a cam driven member 133 which has its lower end slotted, providing two members 135 and 136 embracing shaft 42 to permit vertical movement and resist lateral displacement. Member 133, which may be identified for convenience as a cam yoke, has a cam follower 138 lying in the cam groove. The cam yoke is carried by a plunger 140 reciprocating in a suitable sleeve 141 provided for it in table 35. Punch plunger 116 is provided with a clevis 142 and in this is fulcrumed a lever 143. One end of the lever has a pivot connection to a link 145 and this link is in turn pivoted to a bracket 146 which may be a part of frame yoke 115. The other end of lever 143 is pivoted to a link 147, and the other end of this link is pivoted to the upper end of plunger 140.

When the feed movement of bar 45 takes place, the parts are in the position shown in Fig. 12. A box part B is fed into position below the punch plate 123 and comes to rest in registry with the plate. Rotation of cam 130 pulls down cam yoke 103 and through the linkage described, the punches are forced through the bottom end of the box part, punch plate 123 meanwhile holding down the box part with spring pressure, and as the punches are raised again the punch plate holds down the box part and frees it from the punches and finally the plate returns to the position shown in Fig. 12, leaving a clear path for the box part which is fed forward one setp at the next feed movement of bar 45.

The punching mechanism may be omitted when it is not desired to provide ventilating openings, and in that case the box bodies are fed directly to the hinge forming apparatus.

Hinge member forming apparatus.

The next work position is substantially between section lines 13 and 16, Fig. 2 and in this position is located mechanism for forming hinge members on both box parts simultaneously. The word "forming" as applied to hinge members is used in its broadest sense to include the forming on or applying to a box part a complete hinge member and, in a more limited sense the word is used to indicate treating or forming a part of the box section itself, as by bending or punching and bending, to constitute a part of a completed hinge member. In the present embodiment of the invention, in this work position, the hinge ears 20, Fig. 6, are formed on the box bodies while the rudimentary hinge members 17 of the box covers are bent into partly finished hinge members 22—23, as previously described in connection with Figs. 7, 9 and 10. The hinge member of box bodies B is completed by inserting a pintle in the ears in the next work position and this is a practical and convenient arrangement in the present embodiment of the invention; but evidently by suitable adaptation of parts a complete hinge member can be formed on one of the box parts at this stage of operations while a partly finished complemental hinge member is formed on the other. It is also evident that devices for forming a hinge member on one of the box parts may be omitted and in that case the hinge members on those parts would be provided independently of the present machine and such box parts would simply be fed into association with the box parts on which hinge members are formed by this machine, at a suitable point, as will be understood from later description. It is also evident that hinge members on box parts C need not be formed at this work position, since the next position of these box parts is an idle one and the formation of hinge members on them could be accomplished at the next or any one of several next succeeding positions. It is more convenient, however, to provide mechanism for simultaneously forming hinge members on a pair of complemental box parts, as will appear.

In this position, (see Figs. 1, 2, 13, 14, 15) a cross bar 150 conveniently of rectangular cross section is arranged at moderate distance above the table and conveniently supported on blocks 151, the cross bar and blocks being secured by through bolts 153 and nuts 154. Above the path of box parts B a mandrel 157 is mounted on cross bar 150. This mandrel is a block of generally rectangular form and it may be channelled on its upper face to accommodate the cross bar, and secured in adjustably fixed position on the bar by a cap 159 and screws 161. Additional means may also be provided for adjusting the die mandrel, and holding it against die pressure, such as screws 162, passing through threaded holes in block 151, and engaging the outer face of the mandrel. These screws may be rotated to adjust the lateral position of the mandrel, and the adjustment then made secure by lock nuts 162$^a$. At its lower end and inner face, that is the face confronting the longitudinal center line of the machine, the mandrel is provided with an inserted die 163. Also located on cross bar 150, but in this case slidably mounted, is a die block 167. This is of somewhat similar form to mandrel 157, that is it is channelled to slidably engage the cross bar and is slidably secured by a cap 169 and screws 170. At its lower end confronting mandrel 157 the die block has an inserted die 172. Dies 163 and 172 are provided with complemental male and female pressing and cutting members 174 and 175, as best shown in Fig. 14. These are properly designed so that when the dies are pressed together they draw and cut the metal of the inner side wall 11 of box part B and form ears 20 as previously described in connection with Fig. 6. Near its other end, substantially over the path of movement of box parts C another mandrel 177 is mounted in adjustably fixed position, and provided with adjusting and holding screws 162, and with this mandrel co-operates a die block 179 generally similar to die block 167 and slidably mounted on the cross bar. Mandrel 177 is provided with an inserted die 181 and die block 179 is provided with an inserted die 182 (see Fig. 15) and these dies are provided with co-operating male and female bending members 184, 185, respectively, designed to produce, when the dies are pressed together upon the inner side wall 15 of box section C, the formation of rudimentary hinge tongue 17 described in connection with Fig. 7.

There is sufficient clearance under mandrels 157 and 177 to permit the respective box parts to pass beneath them to a position in which the box parts are approximately centered in respect to the bottoms of the mandrels. Before the box parts come into position die blocks 167 and 179 are withdrawn. The mandrels are so located that when the box parts are moved upward, their inner side walls 11 and 15 respectively clear the inwardly projecting members 174 and 184 of dies 163 and 181. The opposite side wall of each box section then lies near the outer face of the lower end of the mandrel snugly, but with reasonable clearance. Just after the box sections come into position they are lifted into engagement with the mandrels; the movable die blocks are then moved forcibly outward and the dies form the hinge members as described; the die blocks then recede. The box parts are then pulled from the male die members by lateral movement toward the center of the machine and stripped from the mandrels by positively acting devices so that they again rest upon table 35 in their normal path of movement and at the next feed movement these parts are passed forward and other similar parts inserted and so on. Devices for performing these operations are as follows:

The die blocks 167 and 169 are moved by toggle links 190, pivotally connected to the blocks and to a plunger 191 vertically movable in a sleeve 193 bolted to the table. The lower end of this plunger is connected to a cam yoke 195, the lower end of which is slotted to straddle shaft 42, as in the case of cam yoke 133. The yoke has a cam follower 197 engaging a cam groove 199 in cam 200.

Below the table is mounted a plate 202 which may be identified as a lifter plate. This is provided with a plurality of pins 204 for lifting box parts B. Usually there are four of these pins located near the four corners of the box part and the pins are arranged to be substantially flush with or below the upper surfaces of the table when the lifter plate is depressed and to lift the box part as the plate is raised and locate it on the mandrel. (See also Fig. 17.) The lifter plate also carries a plurality of pins 206, similarly arranged and acting in a similar way for box parts C. The pins 204 and 206 pass through suitable holes in the table. Since the sides of box parts C are in the present instance lower than those of box parts B the lower face of mandrel 177 is closer to the table than the lower face of mandrel 157 and the length of pins 206 may be regulated so that their upper ends go further below the table top in the downward movement of the lifter plate, and, therefore, the same upward movement of the lifter plate causes the upper ends of pins 206 to bring the box parts C into proper work position on mandrel 177.

Strippers are provided to positively remove the box parts from the mandrels. A stripper bar 208 is located parallel to the forward face of mandrel 157 and another stripper bar 209 is located near the rear face of the mandrel. These stripper bars are connected to lifter plate 202 by rods 212 passing through holes in the table. Other stripper bars 214—215 are provided in similar locations for mandrel 177 and these are connected to the lifter plate by rods 217. The stripper bars have each one or more lugs 219

(see also Fig. 18) extending into recesses 221 in the adjacent faces of the mandrels. Stripper lugs 219 are located above the upper edges of the box part sides, with slight clearance when the lifter plate is depressed, and maintain the same relation to the box side edges when the box parts are placed on the mandrels. After the hinge members are formed and the lifter plate commences to drop, the lugs strike the upper edges of the box parts and force them from the mandrels until they rest on the table. When the pressing action occurs the box parts are moved laterally somewhat away from the center of the machine. To provide for this movement and also to move them back again to proper position and free them from the male die members, devices which may be identified as adjusting arms 223, are provided, one for each mandrel. The upper end of each arm is pivoted in a clevis 224 which may be formed on the top plate of the corresponding mandrel, as plate 159 of mandrel 157. The lower end of this lever lies against the outer side of the corresponding box part and is urged into engagement with the box part by a spring 226 located in a suitable socket in adjacent block 151. The adjusting arms are moved back positively to permit the lateral movement of the box parts during the pressing action by pins 228 passing through the mandrels and longitudinally movable, one end of each pin engaging with a face of one of the movable die bodies 167 or 179 and the other end of the pin engaging against the adjusting arm. When the box parts are lifted into position on the mandrels their outer side walls fit easily between the mandrels and the ends of the adjusting levers, and as the dies move to form the hinge members, pins 228 move the adjusting arms outward to prevent undue pressure against the box parts. When the dies are retracted springs 226 cause the adjusting arms to force the box parts laterally and then the strippers remove the box parts as previously described.

The lifter plate 202 is raised and lowered by a cam disk 230 on the main shaft. This cam disk has a cam groove 232 in which is located a cam follower 234 carried by a cam yoke 236 slotted to embrace shaft 42. The cam yoke is connected to the lifter plate by rod 238 and the position of the plate in regard to the cam yoke may be adjusted by means of screw threads formed on the rod and a lock nut 240, and this adjustment is representative of adjusting devices that are generally applied to the connections between the different cam yokes and their driven parts, as shown, but not particularly described in connection with each of the different devices. The cam groove 232 is formed so that the lifter plate commences to rise shortly after the box parts are in the corresponding work position, and completes its movement before cam groove 199 of toggle operating cam yoke 195 moves the forming dies to any great extent; and cam groove 232 has a dwell, that is a concentric, approximately semi-circular portion, to retain the lifter plate in elevated position while the dies are in operative engagement with the box part.

Lifter plate 202 with its connected parts is quite heavy and in some cases, and especially when the machine is run quite fast, there is some tendency for the cam mechanism to impart a somewhat jerky movement to the lifter plate, and although it is not necessary in all cases, I prefer in the present embodiment of the invention to provide means to relieve the cam mechanism of a part of the weight of the lifter plate and to thereby steady the movement of this member. For this purpose rod 238 is provided with an upward extension 241 and a spring 242 is arranged to act between a collar 243 on the upper end of the rod and a longitudinal block or frame member 244, which may also be arranged to provide an additional support for cross bar 150. The spring tends to urge the lifter plate upward and to carry a substantial part of its weight, so that the cam mechanism is relieved of strain and the movement of the plate is rendered satisfactorily smooth and steady.

When the hinge member forming operation at this work position is completed the box parts again lie on the table in their normal path of movement and are advanced one step at the next feed stroke of the feed bars 45 and 55, that is, to the work position arranged for insertion of hinge pintles in box parts B, in the present embodiment of the invention.

When it is desired to provide box bodies B with match striking corrugations 25 (see Fig. 6), these corrugations may be produced at the same time that the hinge ears are punched by providing die members 163 and 172 with suitable complemental projections and depressions arranged along surfaces 164 and 173 of the respective die members.

*Pintle inserting mechanism.*

A considerable part of the mechanism for inserting the pintles is located just to the rear of section line 16, Fig. 2, and the box parts are held here for pintle insertion, but a part of the pintle handling mechanism extends further rearward in the machine and substantially to the section line 20 of Fig. 2. Since considerable longitudinal space in the machine is thus taken up by the pintle mechanism, certain idle positions of the box parts are provided, particularly as shown two idle positions between the pintle inserting location and the next work position. Also, the position of box parts C opposite box parts B at the pintle inserting position are idle positions of the first mentioned box parts due to the fact that in the present embodiment of the invention it is not necessary to perform any operation upon the cover parts at this point. Such idle positions of the box parts as are mentioned are due to the general design of the machine and evidently with pintle inserting mechanism of a different sort some or all of the idle positions may be eliminated.

The pintle inserting mechanism is best shown in Figs. 1, 2 and 16 to 19, inclusive. A mandrel 245 is provided for the box bodies, elevated sufficiently above the table to permit the passage of the bodies. The mandrel is supported by a cross piece 247 and this in turn is supported by blocks 249 and 251 held by bolts 253. Lifter plate 202 previously mentioned, has an extension 255 carrying pins 257 passing through holes in the table, usually four in number, one arranged near each corner of the box part. When the lifter plate is raised the pins elevate the box part and place it on the mandrel, substantially at the last work position. Strippers are also provided including stripper bar 209 previously mentioned and connected to lifter plate as described. This stripper bar is provided with lugs 259 extending into recesses 261 provided in mandrel 245 and its supporting plate 247.

At the rear side of the mandrel is arranged another stripper bar 263 connected to the extension of the lifter plate by rods 265 and this stripper bar is provided with lugs 259, as in the case of the opposite bar. The lugs 259 lie above the edges of the side walls of the box part at all times and when the lifter plate descends after the pintle is inserted, the lugs strip the box part from the mandrel and restore it to its proper path of movement on the table. Block 251 supports a transverse member 247, and is also arranged to provide pintle guiding and cutting devices opposite the inner face of the mandrel. In Figs. 18 and 19 a box part is shown in position on the mandrel 245 with its pintle receiving wall between the mandrel and block 251. The pintle, consisting in this case of a piece of suitably stiff wire supplied continuously from a reel, is to be inserted into the pintle ears 20 through the apertures 21. Block 251 is provided with a wire guide consisting of a sleeve 268 having a central bore of proper character to fit the wire quite snugly but to permit the wire to slide freely through the guide. Near the guide sleeve is another guide consisting of a block 272 inserted in block 251 and provided with a channel 274, the outer face 276 of which is arranged at a moderate angle to the longitudinal axis of the machine, in line with the bore of guide sleeve 268 and in line with opening 21 of the left hand hinge ear 20 as viewed in Fig. 18. The pintle wire 270 thus has a straight run through guides 268 and 274 and hole 21.

An abutment is provided for the inserted end of the wire to limit the wire feed movement and also to effect insertion of the pintle into the other hinge ear, consisting in this case of a shoulder 278 forming one of the elements of a recess 280 in a sliding member 282 located in a slot 284 formed in mandrel 245. Intermediate guide sleeve 268 and guide block 272, a plunger 286 is arranged to reciprocate laterally in a slot provided in block 251. At its inner end this plunger has a substantially squared face 288 and in this face is a shallow channel 290 to engage and guide the pintle. At one side the inner end of the plunger is also formed into a cutting edge 292 moving against the adjacent face of guide sleeve 268 to cut off the wire 270 when it has been fully inserted into engagement with shoulder 278. Fig. 18 shows the parts after the wire has been so inserted and after plunger 286 has moved inward cutting off the wire and carrying the right hand end of the pintle into position to be inserted in the right hand hinge ear 20. The pintle is now engaged and guided by the shallow channel 290 in the end of the plunger. In this movement the pintle may be slightly sprung, as shown, but is not permanently bent and when inserted in the other ear straightens itself out and is retained in the ears by the proximity of its ends to the outward ends of the pintle ears. The sliding member 282 is now moved to the right as shown in Fig. 19. Shoulder 278 forces the pintle to the right so that its right hand end enters the right hand hinge ear. As sliding member 282 completes its movement as shown in Fig. 19 the pintle is freed from shoulder 278 and completely inserted in the box part, and the formation of this hinge member is completed.

To feed the continuous pintle wire intermittently to the inserting and cutting off mechanism, the following devices are provided. A sliding block 294 is arranged below the table in flanged guides 296, to reciprocate in line with the angular direction of the pintle wire above mentioned, that is at the same moderate angle to the axis of the machine. This block has a member or lug 298 extending up through a slot 300 in the table. At one side of lug 298 is a plate, or plane surface 302 over which the wire passes. A pawl 304 is pivoted at 306 to lug 298 and formed so that its lower end 308 constitutes a tooth to engage and clamp the wire between the tooth and the surface 302. At each return movement of block 294 the pawl tooth rides idly back over the wire and at each feed movement of the block the tooth grips the wire and feeds it forward a distance equal to one pintle length.

The pawl may engage the wire by gravity, or a spring may be provided, as may be desirable. The wire is carried by a suitable reel (not shown) and usually passes through suitable wire straighteners 310—312 located on the table. Wire feed block 294 is also provided with a downwardly extending lug 314 of substantially rectangular cross section and this lug is of considerable length transversely of the machine, as best indicated in Fig. 18. The lug is engaged on its two opposite long faces by rounded blocks 316 adjustably mounted in the upper end of a lever 318, conveniently by means of screws 320. The lower end of the lever is carried by a transverse shaft 322, located in bearings 324 fixed to longitudinal frame members 38 and 39. The lever has a cam follower 326 located in a cam groove 328 of cam 330 fixed on shaft 42. The cam groove is arranged so that the lever is oscillated to feed the wire forward after the box part is located on the mandrel. As the adjustable lever jaws 316 move lug 314 of the wire feed block forward and back the block slides laterally between the jaws, thus permitting the movement of the feed block in a different plane from the movement of the lever without providing complicated connecting mechanism. After the pintle is inserted and cut off the feed block is retracted by the cam.

The cutting and pintle guiding plunger 286 has its outer end inserted in a socket in a block 331 and adjustably secured by a set screw 333. The block is connected by a link 335 with the upper end of a lever 337, which passes through a slot in the table and is fulcrumed at 339 on a bracket 341, secured to the underside of the table. The lower end of the lever has a cam follower 343 located in a cam groove 345 on the rear face of cam disk 230 previously mentioned. The cam groove has a concentric portion interrupted by a "rise" 347 including a short concentric portion sufficient to move the cutting plunger in to cut off the wire after the wire is inserted by the movement of feed block 294 and hold the wire during insertion into the opposite pintle ear by the movement of slide 282, and thereafter the lever is moved to retract plunger 286, ready for another cutting movement.

Pintle slide 282 has a stud 348 extending up through a slot in plate 247 and the upper end of this stud is connected with a rod 349 extending rearwardly of the machine to a point corresponding with the next work position, at which rod 349 rests in a guide slot 354 formed in a block 356, later more particularly described. (See also Fig. 20.) A spring 351 is stretched between a pin 352 on rod 349 and a pin 353 located on a stationary support, such as plate 247, to retract rod 349 and slide 282. Adjacent to guide slot 354, rod 349 is provided with an angular cam face 358. A vertically moving roller or stud 360 co-operates with this cam face by vertical movement at the proper moment to draw rod 349 to the right (as viewed in Figs. 18 and 19) and so move the slide and slide shoulder 278 and insert the pintle in the right hand hinge ear.

The box parts are now advanced by three successive feed movements to the next work position, just to the right of section line 20, Fig. 2.

Burr stamping mechanism.

At this position mechanism is provided (Figs. 1, 2 and 20) for removing burrs formed about the ventilating openings 30 and conveniently this is done by stamping, to sufficiently flatten out the burrs or ragged edges, extending outward from the box bottom, produced by the punches, as previously explained. Block 356 previously mentioned, provides a channel for the passage of box parts B and in the sides of this channel guides 365 may be located, provided with flanges 367 overlying the upper edges of side walls of the box body. Block 356 has an extension 369 bored to provide a sleeve for reciprocating plunger or stamp 371. The lower end of this plunger is substantially flat and co-operates with a block 373 inserted in the table. The block and the plunger are in line with the ventilating openings 30 and when the box part is in position the plunger is dropped forcibly upon the box bottom 10 and stamps the burrs over against block 373. The upper end of plunger 371 is provided with a clevis 375 and in this is pivoted on a stud 377 a lever 379, fulcrumed at 381 in the upper end of a link 383. The lower end of the link is pivotally mounted on a lug 385 bolted to the table. At an intermediate part of the lever a link 387 is pivoted to it and this link is in turn pivoted to the upper end of a rod 389 connected adjustably to a cam yoke 391. The bifurcated lower end of this cam yoke embraces shaft 42. On the shaft is a cam disk 393, having a cam groove 395, in which rests cam follower 397 mounted on cam yoke 391. The inner surface of the cam groove has a depression or drop 399 into which the cam follower falls to permit the stamping movement of the plunger. The time of the plunger drop is controlled by a detent lever 403, fulcrumed at 405 and passing through a slot in the table. The upper end of this lever has a notch 407 forming a shoulder 409 normally engaging beneath plunger lever 379. The lower end of lever 403 is provided with an angular face 411 co-operating with an angular cam 413 secured to the periphery of cam disk 393. Lever 403 is provided with a spring 415 urging its upper end into engagement with lever 379 to bring shoulder 409 beneath the latter lever. When plunger 371 is elevated by the action of cam 395 shoulder 409 of the detent lever 403 springs under the plunger lever and holds it and the plunger up until cam 413 acts on the lower end of the detent lever to withdraw the shoulder from under lever 379 and thereupon plunger 371 drops by gravity, or the force of its blow upon the box bottom may be increased as desired by a spring 417 connected to an extension 419 of the lever and to the table at 421. When the plunger drops cam follower 397 falls into cam depression 399 and further rotation of the cam again elevates lever 379 and it is then reengaged by detent 409. The action of cam 413 to release the lever is timed so that, of course, the stamping action takes place during the pause of the box part at this work position; and when stud 360 previously mentioned, for operating rod 349 to effect a part of the pintle inserting operation, is located, as in the present embodiment, on plunger 371, the release of detent 409 is, of course, also timed so that the dropping of the plunger and consequent action of stud 360 to effect pintle insertion occurs after the pintle is cut off and arranged for insertion into the right hand pintle ear by the movement of a slide 382, as previously described in connection with Figs. 18 and 19. If the burr stamping operation is omitted, evidently simplified means can be provided for moving rod 352 or otherwise effecting the insertion of the pintle into the right hand ear.

After the stamping action the box parts are advanced to the next work position. Here the box body last acted on by the stamping mechanism meets a cover part C delivered by the transverse conveyor, as previously explained.

*Hinge connecting mechanism.*

Figs. 21 and 22 show mechanism for manipulating the box cover parts to commence the operation of connecting the hinge members, in different positions. This mechanism is located approximately between the section lines 21 and 24, Fig. 2. Fig. 21 shows a cover part C brought into contact with a body part B by the transverse feed bar 63. In this position the cover part lies over a tilting lever 423 having a broad end 424 engaging the cover part substantially throughout its length to steady it and hold it in proper position during the tilting movement. The lever is located in a recess 426 in the table and is pivoted on a shaft 428. The lever has an arm 430 to which is pivoted a link 432, and the lower end of this link is pivoted to an arm 434 extending from a hub 436 adjustably secured on a vertical rod 438 by a set screw 440. Shortly after the box parts come into position, as shown in Fig. 21, rod 438 is raised by mechanism, later described, and lever 423 is thus moved up to the position shown in Fig. 22 until box part C rests against the longitudinal guide rail 442 bolted to supports 444 located along the side of the table. In this movement the outer side of the box cover describes an arc, and it is guided by arc shaped guides 446 secured to suitable fixed supports at 448. The box part is held against guide 442 with sufficient clearance to permit easy sliding movement by a guide rail 450 carried by the arm 452 pivoted at 454 to a bracket 456 secured to the table. The rail arm 452 is arranged so that as the outer side of the box cover strikes it, the arm and the rail 450 are raised to permit the box part to pass, and the rail then drops back into guiding position, as shown in Fig. 22. Tilting lever 423 is then retracted by downward movement of rod 438. The relation of the hinge parts when the box cover is tilted to the position of Fig. 22, is shown in enlarged detail in Fig. 23. The hooked end 22 of the cover hinge member lies against one side of box body B and is directed upward toward the pintle 28, ready to pass between the pintle and side of the body when the cover part is moved upward in relation to the body. The ends 16 of the cover part somewhat overlap the ends 12 of the body so that the cover is caused to move along with the body when the body is fed forward.

The associated box parts are then advanced to the next work position in the same relative positions, the cover in this movement sliding freely between guide rails 442 and 450.

Guide rail 450 with its supporting arm 452 may be omitted in some cases. For example, it is found that this guide member is unnecessary when the machine is run at high speed.

*Additional hinge connecting mechanism.*

Mechanism for completing the interconnection of the hinge members is located substantially between section lines 24 and 27, Fig. 2, and is shown in Figs. 1, 2, 24, 25, 26 and 26ª. Guide rail 450 previously mentioned extends substantially up to the present work position, and guide rail 442 extends through this work position, as clearly shown in Fig. 2. Cooperating with rail 442 is another guide rail 460 carried by the arm 462 pivoted at 464 on bracket 456, previously mentioned. As the box parts are moved along into the present work position the cover slides between rails 460 and 442, as shown in Fig. 24. A tilting member 466 is located at about the longitudinal center of cover part C at a point opposite rail 460. This member consists simply of the end of a suitably curved lever 468 pivoted at 470 on the arm 472 extending from a bracket 474 located on the table. Lever 468 has an arm 476 sufficiently long and heavy to constitute a counterweight, and this arm is provided with a laterally extending pin 478. Vertical rod 438, previously mentioned, passes through a suitable guide sleeve in the table, and in addition to arm 434, previously mentioned, located below the table, it carries above the table an arm 480, and this arm is provided with an upwardly extending pin 482, the upper end of which co-operates with pin 478 of the tilting lever 468. Rod 438 also carries an arm 484, the end of which extends along arm 462 of rail 460, as best understood in Fig. 2. Rod 438 is moved vertically by a cam yoke 486 having a cam follower 488 engaging a cam groove in cam disk 490 carried by main shaft 42. The cam yoke and cam disk are shown in full lines in Fig. 1, and the cam yoke and cam groove, and cam follower, 488 are shown in dotted lines in Fig. 24, it being understood that the cam groove there shown is not a part of the cam body represented in full lines. By the cam mechanism described, rod 438 is reciprocated vertically to perform the operations mentioned in connection with Figs. 21 and 22, and at the same time when the rod is raised from the position shown in Fig. 24, at the present work station arm 484 first raises arm 462 and so raises rail 460 clear of cover C, and then pin 482 engages pin 478 and swings the tilting lever 468, so that its member 466 engaging the cover part swings that part out and then down, as shown in Fig. 25.

An elevating plunger 491 of general rectangular cross section is mounted to reciprocate vertically in a suitable hole provided for it in the table. At its upper end this plunger carries an upward extension 492 of reduced width and in the upper edge of this extension is formed a trough-like recess 493 shaped to fit curved hinge member 23. Below the table the plunger is provided with a cross piece, or head 494 extending forward and rearward from the body of the plunger and stop screws 495 pass through holes in these extensions and through spring sockets 496 bored in the table and the ends of the screws engage in threaded holes in the table, as most clearly shown in Fig. 26ª. Springs 497 surround the screw shanks in the sockets and bear against the ends of the sockets and against the ends of cross member 494 to retract the plunger until it is stopped by engagement with heads of screws 495, which may be adjusted to limit the downward movement of the plunger. The plunger is lifted by a lever 501 pivotally mounted at 503 in a bracket 505 bolted to the under face of the table and provided at its other end with a tappet 509, which may be adjustably secured in the lever. Lever 501 is operated by cam members carried by a cam plate 511. The lever has a downwardly extending arm 513 carrying a cam roller 515 confronting the periphery of the cam plate. The cam may be arranged in two steps 517 and 519. The first step may be provided to act on the cam roller and raise the lever to bring the elevating plunger into initial contact with the lower side of cover part C, and the next step or elevation 519 of the cam then acts to raise the elevating plunger to its uppermost position, as shown in Fig. 25, and raise the cover so that hook 22 of the cover hinge member is inserted between the pintle and the box body at about the time that guide rail 460 is being lifted, and the cover tilted away from the position shown in Fig. 24.

When the box parts come into position as shown in Fig. 24, plunger 491 is retracted as shown in that figure and in Fig. 26. The curved hinge member slides into groove 493 of the plunger extension ready to be engaged and lifted by the plunger. The plunger is raised during the tilting movement of the cover C when it is about at vertical position, and this lifting movement inserts the end of hook 22 between the pintle and the adjacent wall of the box body and further lifts the cover until curved portion 23 fits about the pintle. In the further tilting of the cover before it approaches the position shown in Figs. 25 and 26, the plunger is withdrawn so that extension 492 does not interfere with further opening movement of the cover. The cover then falls flat on the table and thereafter the complete box with the hinge members connected, but not permanently fastened, is advanced to the next work position.

*Hinge clinching mechanism.*

Mechanism for permanently connecting the hinge members together is located to the right of section line 27, Fig. 2, and is shown in Figs. 27 and 28. The arm 525 is pivoted at 527 in a bracket 528 secured to the table and conveniently this arm is bent at an angle at 530 so that the main part of the arm lies approximately parallel to the table. Adjustably secured by screws 532 on this arm is a die block 534 provided with a die abutment member or face 536. Pivoted to die block 534 at 538 is a die lever 540 carrying a die 542 adapted to cooperate with die abutment 536. The free end of lever 540 is connected by link 544 to a vertical rod 546 passing through a suitable reciprocating bearing in the table and provided with a cam yoke 548, which has a cam follower 550 located in a cam groove 552 of cam disk 554 carried by shaft 42. An adjustable stop consisting conveniently of a screw 556 passing through arm 525 serves to limit the opening movement of die lever 540 in relation to die block 534, and an adjustably fixed stop, consisting conveniently of a screw 558 entering a suitable screw threaded hole in the table, serves to limit the downward movement of arm 525.

When the box parts are fed to this work position the mechanism is in the position indicated in Fig. 27; that is cam 552 holds rod 556 in its uppermost position; die lever 540 is held up against its side and arm 525 is held up away from the box parts. Thus, die 542 is separated from die abutment 536. The cam now causes rod 546 to descend, and die abutment 536 descends into box part B close to inner wall 11 thereof. Die 542 descends into cover part C opposite the end of hinge hook 22. Die 542 is provided with a suitably formed surface 560 to bend the hooked end of the cover hinge member around the pintle and this is done in further downward movement of rod 546 which first brings arm 525 down on its stop and then pulls down the outer end of die lever 540, clinching the box parts and the hinge member between the die and the die abutment and completing the hinge connection, as clearly shown in Fig. 29 by bending hook 22 substantially entirely around the pintle 28. The cam then raises rod 546 and releases the die jaws from the box parts in an obvious way. The completed box is then fed forward another step by feed bar 45 and may be carried onward to a filling machine or otherwise disposed of by an extension of the feed bar, or by any other suitable conveyor.

In the previous description reference has been made mainly to the progress of a single pair of complemental box parts through the machine, but it will be understood that the parts follow each other in regular sequence and that appropriate operations are performed on different box parts of the series simultaneously at all the different work positions and that the action of the machine is completely automatic, taking in blanks having no hinge members or only rudimentary hinge members, at the feed end, forming the hinge members and finally connecting the hinge members permanently together and delivering finished boxes in rapid succession.

While it is generally desirable to provide all of the instrumentalities mentioned, or their equivalents, some of them may be omitted, and the machine will still operate satisfactorily and produce formed hinge members or assembled boxes. For instance, the ventilator-opening punching apparatus or the burr stamping apparatus may be omitted without affecting the general organization or principal functions of the machine. Hinge forming mechanism for either of the box parts may also be omitted in some cases, for instance, when suitable hinge members are desirably formed on such parts by other or separate apparatus and the machine can in that case easily be adapted to form the hinge members on the other box parts and to associate the two complemental parts of the boxes and complete the hinge connection. It will also be understood that in the broader aspect of the invention it is not limited to the formation of hinge members of the kind shown, but that the hinge parts may be varied greatly by suitable variations in structure. It is manifestly impossible to point out all of the many modifications which may be made within the principles of the invention, but these will be sufficiently understood by persons skilled in the art from a study of the single embodiment shown and described.

What I claim is:—

1. In a box part hinge forming and assembling machine, means for connecting a hinge member to a box part, means for subsequently bringing a complemental box part having a hinge member in proximity to the first box part, and means for connecting the hinge members together.

2. In a box part hinge forming and assembling machine, means for connecting a hinge member to a box part, means for bringing a complemental box part having a partly formed hinge member in proximity to the first box part, means for engaging the hinge members, and means for completing formation of the partly formed member to complete the hinge assembly of the box parts.

3. In a box part hinge forming and assembling machine, means for attaching a hinge pintle to a box part, means for bringing another box part having a hinge member in proximity to the first box part, and means for connecting the hinge member and pintle together.

4. In a box part hinge forming and assembling machine, means for attaching a hinge pintle to a box part, means for bringing another box part having a hinge member in proximity to the first box part and engaging the hinge member with the pintle, and means for completing the forming of the hinge member to complete the hinge connection of the box parts.

5. In a box part hinge forming and assembling machine, means for connecting a hinge pintle to a box part, means for moving a complemental box part having a partly formed hinge member in proximity to the first box part, means for interconnecting the hinge member and pintle, and means for completing the formation of the hinge member to complete the hinge connection of the box parts.

6. In a box part hinge forming and assembling machine, means for attaching a hinge member to a box part, means for shaping a hinge member on a complemental box part, and means for connecting the hinge members together.

7. In a box part hinge forming and assembling machine, means for attaching a hinge member to a box part, means for partly shaping a hinge member on a complemental box part, means for interconnecting the hinge members, and means for completing the formation of the partly-formed hinge member to complete the hinge assembly of the box parts.

8. In a box part hinge forming and assembling machine, means for attaching a hinge pintle to a box part, means for shaping a hinge member on a complemental box part, and means for connecting the hinge member and pintle together.

9. In a box part hinge forming and assembling machine, means for attaching a hinge pintle to a box part, means for shaping a hinge member on a complemental box part, means for bringing the box parts together, and means for connecting the hinge member and pintle together.

10. In a box part hinge forming and assembling machine, means for attaching a hinge pintle to a box part, means for partly shaping a hinge member in a complemental box part, means for interconnecting the hinge members, and means for completing the formation of the partly formed member to complete the hinge connection of the box parts.

11. In a box part hinge forming and assembling machine, means for attaching a hinge pintle to a box part, means for partly shaping a hinge member in a complemental box part, means for bringing the parts together with the hinge member and pintle in engagement, and means for completing the formation of the partly formed hinge member.

12. A box part hinge forming and assembling machine comprising means for attaching a pintle to a box part, means for acting on a rudimentary hinge-member of a complementary box part to produce a partly-formed hinge member thereon, and means for connecting said hinge member and pintle together.

13. A box part hinge forming and assembling machine comprising means for attaching a pintle to a box part, means for bending a rudimentary hinge member of a complementary box part to produce a hooked hinge member thereon, and means for connecting said hinge member and pintle together.

14. A box part hinge forming and assembling machine comprising means for attaching a hinge pintle to a box part, means for partly shaping a rudimentary hinge member of a complemental box part, means for engaging the hinge member and pintle together, and means for completing the formation of the partly shaped hinge member to complete the hinge connection of the box parts.

15. In a box part hinge forming and assembling machine, means for forming a box part to receive a pintle, means for inserting a pintle in the box part, means for interconnecting with the pintle a partly formed hinge member of a complemental box part, and means for completing formation of the partly formed hinge member to complete the hinge connection of the box parts.

16. In a box part hinge forming and assembling machine, means for forming a box part to receive a pintle, means for inserting a pintle in the box part, means for shaping a hinge member in a complemental box part, and means for connecting the hinge member with the pintle.

17. In a box part hinge forming and assembling machine, means for forming a box part to receive a pintle, means for inserting a pintle in the box part, means for bending a hinge member in a complemental box part, means for connecting the hinge member with the pintle, and means for completing formation of the hinge member about the pintle.

18. In a box part hinge forming and assembling machine, means for forming pintle ears in a box part, means for inserting a pintle in the ears, means for shaping a hinge member in a complemental box part, and means for connecting the hinge member with the pintle.

19. In a machine of the class described, means for forming pintle ears in successive similar box parts, means for inserting pintles in the ears of successive box parts, means for shaping hinge members in successive complemental box parts, and means for connecting the box part pintles and hinge members together in successive pairs to form complete hinged boxes.

20. A box forming machine comprising means for forming pintle receiving members in successive similar box parts, means for inserting hinge pintles in said members, means for forming complemental hinge members in successive complemental box parts, means for bringing the hinge members of successive pairs of complemental box parts together, and means for completing the hinge engagement of the box parts.

21. In a box forming machine, means for advancing a partly formed box part blank, means for forming in a side wall of the blank pintle ears having confronting openings, means for inserting a separate rod-shaped pintle in ears of each of said blanks, means for moving a complemental box part having a hooked hinged member, into association with the blank, and for engaging the hooked hinge member with the pintle, and means for completing the formation of the hinge by clinching the hook part about the pintle.

22. A box part hinge forming and assembling machine comprising a box part conveyor, and mechanisms located at different positions of the conveyor travel including means for forming pintle-receiving members in a box part, means for inserting a pintle in said members, means for bringing another box part provided with a hinge member into association with the box part first mentioned, and means for connecting the hinge member and pintle together to form a complete hinged box.

23. In a box part hinge forming and assembling machine, means for forming hinge members simultaneously in two complemental box parts, means for advancing the parts and inserting a pintle in the hinge members of one of them, and means for moving the box parts together and completing the hinge assembly.

24. A box part hinge forming and assembling machine comprising two parallel step-by-step conveyors for separate pre-formed box parts, means for forming hinge members on box parts advanced by one of the conveyors, means at a substantially opposite position for shaping hinge members on box parts advanced by the other conveyor, and means for operating the two hinge forming means simultaneously.

25. A box part hinge forming and assembling machine comprising two parallel step-by-step conveyors for box parts, means for forming pintle ears on box parts advanced by one of the conveyors, means at a substantially opposite position for shaping hinge members on box parts advanced by the other conveyor, and means at a subsequent conveyor position for inserting pintles in the ears.

26. A box part hinge forming and assembling machine comprising two parallel step-by-step conveyors for box parts, means for forming pintle ears on box parts advanced by one conveyor, means at a substantially opposite position for shaping hinge members on box parts advanced by the other conveyor, means at a subsequent conveyor position for inserting pintles in the ears, and means for bringing the box parts together and completing the hinge connection.

27. A box part hinge forming and assembling machine comprising two parallel step-by-step conveyors for box parts, means for forming pintle ears on box parts advanced by one conveyor, means at a substantially opposite position for shaping hinge members on box parts advanced by the other conveyor, means common to both of the hinge forming means for operating them simultaneously, and subsequently-acting means for inserting pintles in the ears.

28. A box part hinge forming and assembling machine comprising two parallel step-by-step conveyors for box parts, means for forming pintle ears on box parts advanced by one conveyor, means at a substantially opposite position for shaping hinge members on box parts advanced by the other conveyor, means common to both of the hinge forming means for operating them simultaneously, subsequently acting means for inserting pintles in the ears, and means for bringing the box parts together and completing the hinge connection.

29. In a box part hinge forming and assembling machine, means for simultaneously forming hinge members in two complemental box parts, means for advancing the parts and inserting a pintle in the hinge members of one of the parts, means for moving the box parts together and engaging the hinge member of one part with the pintle of the other, and means for completing the hinge connection.

30. In a box part hinge forming and assembling machine, means for simultaneously forming hinge members in two complemental box parts, means for advancing the parts and inserting a pintle in the hinge members in one of the parts, means for moving the box parts together, and tilting one of the parts to engage its hinge member with the pintle, and means for advancing the box parts in substantially open relation and completing the hinge connection.

31. In a box part hinge forming and assembling machine, means for forming pintle ears in a box part, means for simultaneously forming a hinge hook on a complemental box part, means for advancing the parts and inserting a pintle in said ears, means for moving the parts together and engaging the hinge hook with the pintle, and means for advancing the parts and completing the hinge connection.

32. In a box part hinge forming and assembling machine, means for forming pintle ears in a box part, means for concurrently forming a hinge hook on a complemental box part, means for advancing the parts and inserting a pintle in said ears, means for moving the box parts together and tilting one of them to engage its hinge hook with the pintle, means for advancing the parts in substantially open relation, and means for clinching the hook member about the pintle.

33. A box part hinge forming and assembling machine, comprising an intermittent conveyor for successive box parts provided with rudimentary hinge members, and means for forming the rudimentary members into partly complete hinge members, means for then moving the box parts into association with other box parts having hinge members, means for tilting the first named box parts and engaging their hinge members with the hinge members of the second named box parts, means for advancing the two parts together and means for completing the formation of the partly formed hinge members.

34. A box part hinge forming and assembling machine comprising an intermittent conveyor for successive box parts provided with rudimentary hinge members, means for forming the rudimentary members into substantially hook shaped hinge members, means for then moving the box parts into association with other box parts having hinge pintles, means for tilting the first named box parts and engaging their hinge members with the pintles, means for advancing the two parts together and means for bending the hinge hooks about the pintles to complete the hinge assembly.

35. A box forming and assembling machine, comprising a first intermittent longitudinal conveyor for a series of box parts, a second intermittent conveyor for another series of box parts substantially parallel to the first, means for operating the two conveyors simultaneously, means for forming hinge members on the box parts advanced by the first conveyor, means at a substantially opposite position for shaping hinge members on box parts advanced by the second conveyor, a transverse conveyor for bringing box parts from one of the first named conveyors into association with box parts carried by the other of said conveyors, means for relatively moving the box parts into association with each other to interconnect the hinge members, and means for completing the formation of the hinge connection to form a complete hinged box.

36. A box forming and assembling machine comprising a first intermittent longitudinal conveyor for a series of box parts, a second intermittent conveyor for another series of box parts substantially parallel to the first, means for operating the two conveyors simultaneously, means for forming hinge members on the box parts advanced by the first conveyor, means at a substantially opposite position for shaping hinge members on box parts advanced by the second conveyor, means at a subsequent work position for inserting hinge pintles in the hinge members of box parts advanced by the first conveyor, a transverse conveyor for bringing box parts from one of the first named conveyors into association with box parts carried by the other of said conveyors, means for relatively moving the box parts into association with each other to interconnect the hinge members, and means for completing the formation of the hinge connection to form a complete hinged box.

37. A box forming and assembling machine, comprising a first intermittent linear conveyor for a series of box parts, means at a first working position in relation to said conveyor for forming hinge members in the box parts, means at a second working position in relation to said conveyor for inserting pintles in said box parts, a second intermittent linear conveyor for another series of box parts, substantially parallel with the first conveyor, means associated with the second conveyor at a position substantially opposite the first work position mentioned, for shaping hinge members on the box parts carried by said second conveyor, a transverse conveyor for moving box parts from said second conveyor into proximity with parts carried by the first conveyor, and means for moving the box parts constituting a complemental pair in relation to each other to effect hinge engagement, advancing the parts together, and completing the hinge connection.

38. A box forming and assembling machine, comprising a first intermittent linear conveyor for a series of box parts, means at a first working position in relation to said conveyor for forming hinge members in the box parts, means at a second working position in relation to said conveyor, for inserting pintles in said box parts, a second intermittent linear conveyor for another series of box parts, substantially parallel with the first conveyor, means associated with the second conveyor at a position substantially opposite the first work position mentioned, for shaping hinge members on the box parts carried by said second conveyor, a transverse conveyor for moving box parts from said second conveyor into proximity with parts carried by the first conveyor, and means at a third and subsequent work position for tilting one of the box parts of each pair to effect initial connection of the hinge members, advancing the box parts and completing the hinge connection.

39. A box forming and assembling machine comprising a longitudinal conveyor for a series of box parts provided with hinge members, a transverse conveyor for another series of box parts provided with hinge members, means operative at one position of the longitudinal conveyor to tilt box parts delivered by the transverse conveyor and effect initial association of the two parts of a complete box with the hinge members in juxtaposition, means at a subsequent position of the longitudinal conveyor for relatively moving the box parts and effecting actual engagement of the hinge members, and means at another subsequent position of the longitudinal conveyor for clinching one of the hinge members to complete hinge connection of the box parts.

40. A box forming and assembling machine comprising a longitudinal conveyor for a series of box parts provided with hinge members, a transverse conveyor for another series of box parts provided with hinge members, means operative at one position of the longitudinal conveyor to tilt box parts delivered by the transverse conveyor and effect initial association of the two box parts of a complete box with the hinge members in juxtaposition, means at a subsequent position of the longitudinal conveyor for lifting and rotating one of the box parts to effect engagement of the hinge members, and means at a subsequent position of the longitudinal conveyor for clinching one of the hinge members to complete hinge connection of the box parts.

41. A box hinge forming and assembling machine comprising means for bringing together successive pairs of box parts provided with hinge members, means for tilting one of the box parts and retaining it in angular relation to the other part with the hinge members in juxtaposition, means for advancing the associated parts to another work position and guiding them in the stated relation during the advance, and means in the last mentioned work position for elevating and tilting the angularly positioned box part to effect interengagement of the hinge members, said means leaving the box parts in substantially wide open position.

42. A box hinge forming and assembling machine comprising means for bringing together successive pairs of box parts provided with hinge members, means for tilting one of the box parts and retaining it in angular relation to the other part with the hinge members in juxtaposition, means for advancing the associated parts to another work position and guiding them in the stated relation during the advance, means in the last named work position for elevating and tilting the angularly positioned box part to effect interengagement of the hinge members, said means leaving the box parts in substantially wide open position, means for advancing the parts to another work position, and means at that position for effecting a permanent connection of the hinge members.

43. In a box assembling machine, a conveyor for bringing box bodies having hinge members to an assembling position, a conveyor for bringing box tops having hinge members into association with the bodies with the cover hinge members adjacent to the body hinge members, a lever for tilting the covers substantially about the hinge member as a center, a guide for the outer edge of the cover during tilting, and longitudinal guides engaging the tilted cover to permit sliding movement of the cover in association with the body to a subsequent work position.

44. Box assembling mechanism comprising a conveyor for moving an associated pair of box parts having hinge members in juxtaposition to a work position, and means at that position for holding one of the box parts, elevating it to effect initial hinge engagement and then moving the box part to substantially open position.

45. A box assembling machine comprising a conveyor for moving a box body having a hinge member in association with a box cover having a hinge member and arranged at a considerable angle to the body with the hinge members of the two box parts in juxtaposition, guide members engaging opposite sides of the cover and permitting sliding movement into work position, a lifting plunger for lifting the cover part, means for moving one of the guide members away from the cover, and means for then tilting the cover outward to substantially open position to effect interconnection of the hinge members.

46. In a box machine comprising means for conveying box parts having interconnected hinge members, means for completing the hinge connection of the parts comprising, a pair of die members, means for moving said members to straddle the hinge members, and means for moving the die members to clinch the hinge.

47. In a box machine comprising means for conveying box parts having interconnected hinge members, means for completing the hinge connection of the parts comprising a pair of pivoted die members, a carrier for said members, and means for moving the carrier to position the die members in relation to the hinge members, and for then moving the die members to clinch the hinge.

48. In a box machine comprising means for conveying box parts having interconnected hinge members, means for completing the hinge connection of the parts comprising a carrier for a die abutment, a die lever pivoted to the carrier, a die carried by the lever confronting the abutment, operating means connected to the die lever and a stop to limit movement of the abutment carrier.

49. In a box machine comprising means for conveying box parts having interconnected hinge members, means for completing the hinge connection of the parts comprising an arm pivoted at a fixed point, a die abutment carrier on the arm, a die lever pivoted to the abutment carrier, a die carried by the lever, the die and die abutment being adapted to grip between them the box hinge parts and clinch the hinge, operating means connected to the die lever and a stop to limit movement of the arm.

50. A box part hinge forming and assembling machine, comprising a longitudinal step-by-step conveyor for advancing box parts in horizontal inverted position and locating them successively in different work positions, a box part mandrel above a box part in one of the work positions, means for lifting a box part from the conveyor and placing it on the mandrel, and means for performing an operation upon the box part while located on the mandrel.

51. A box part hinge forming and assembling machine, comprising a step-by-step longitudinal conveyor for advancing a box part in horizontal inverted position, hinge forming mechanism adjacent to the conveyor, comprising a box part holding member above the box part and a die member movable toward and from the holding member, and means for lifting the box part from the conveyor onto the holding member and returning it to the conveyor after the die member has operated on the box part.

52. A box part hinge forming and assembling machine, comprising a conveyor for advancing box parts in horizontal inverted position, a box part mandrel flat to the conveyor, a forming die thereon, a movable die member adapted to co-operate with the mandrel and its die, means for lifting a box part from the conveyor and placing it on the mandrel, means for operating the dies to act upon a member of the box part, and means acting after retraction of the dies to move the box part laterally to free it from the mandrel die member, and means for then stripping the box part from the mandrel.

53. A box part hinge forming and assembling machine, comprising a longitudinal step-by-step conveyor for box parts, a mandrel located over a box part in one position of the conveyor, means co-operating with the mandrel for performing an operation on a box part, and means for placing the box part on the mandrel and returning it to the conveyor comprising a lifter plate, lifting pins thereon engaging one side of the box part and strippers connected to the lifter plate and engaging the opposite side of the box part.

54. A box part hinge forming and assembling machine, comprising parallel longitudinal step-by-step conveyors for box parts, a mandrel located over a box part in one position of each conveyor, means co-operating with each mandrel for performing an operation on a box part and means for placing a box part on each mandrel and returning it to the conveyor, and means for freeing the box part on each mandrel by lateral movement after the box part has been operated upon and before it is returned to the conveyor.

55. A box forming and assembling machine comprising a pair of parallel conveyors and box part forming mechanisms arranged substantially transversely of both conveyors, comprising fixed die members, one near each conveyor, two movable die members, one co-operating with each fixed die member, and means for moving the movable die members simultaneously in timed relation to the conveyor movement.

56. A box forming and assembling machine comprising a pair of parallel conveyors and box part forming mechanisms arranged substantially transversely of both conveyors, comprising fixed die members, one near each conveyor, two movable die members, one co-operating with each fixed die member, toggle mechanism for moving the movable die members simultaneously, and means for operating the toggle mechanism in timed relation to the conveyor movement.

57. In a box part hinge forming machine, a table, two parallel step-by-step conveyors, a support located above the table transverse the conveyors, two die mandrels fixedly located on the support, one above each conveyor, two movable die blocks mounted on the support between the die mandrels, means for simultaneously moving the die blocks outwardly toward the mandrels and for retracting them.

58. In a box part hinge forming machine, a table, two parallel step-by-step conveyors, a cross piece located above the table transverse the conveyors, two die mandrels fixedly located on the cross piece, one above each conveyor, two movable die blocks mounted on the cross piece between the die mandrels, toggle links connecting the die blocks and means for operating the toggle links to simultaneously move the blocks toward and from the mandrels.

59. In a box part hinge forming machine, a table, two parallel step-by-step conveyors, a cross piece located above the table transverse the conveyors, two die mandrels fixedly located on the cross piece, one above each conveyor, two movable die blocks mounted on the cross piece between the die mandrels, means for simultaneously moving the die blocks outwardly toward the mandrels and for retracting them, and means for simultaneously lifting box parts from the two conveyors and placing them on the respective mandrels while the die blocks are retracted and for withdrawing the box parts and returning them to the conveyors after the die blocks have been advanced and again retracted.

60. In a box part hinge forming machine, a table, two parallel step-by-step conveyors, a cross piece located above the table transverse the conveyors, two die mandrels fixedly located on the cross piece, one above each conveyor, two movable die blocks mounted on the cross piece between the die mandrels, means for simultaneously moving the die blocks outwardly toward the mandrels and for retracting them, and means for simultaneously lifting box parts from the two conveyors and placing them on the respective mandrels while the die blocks are retracted and for withdrawing the box parts and returning them to the conveyors after the die blocks have been advanced and again retracted, said means including a lifter plate below the table, lifter pins carried by the plate and strippers connected to the plate and having members adapted to engage both the box parts.

61. A box forming and assembling machine, comprising a conveyor for advancing successive box parts, means located adjacent to the conveyor for inserting pintles in ears formed in the box parts comprising means for inserting a continuous pintle wire into one of the ears, a combined cutting and positioning element for cutting off the wire and registering the cut end with the other ear, and means for moving the pintle endwise and locating it in proper engagement with both ears.

62. A box forming and assembling machine, comprising a conveyor for box parts and means for applying pintles to pintle receiving ears formed in the box parts, comprising a pintle guide directed at an angle toward one of the ears, means for intermittently grasping and feeding forward a continuous pintle wire in line with the guide into said ear, a combined cutting and positioning element for cutting off a piece of the wire to form a pintle and registering the cut end with the opposite ear, and means for moving the pintle endwise to insert it in the other ear.

63. In a box forming and assembling machine, comprising a conveyor for advancing box parts step-by-step, means at one position of the conveyor for forming hinge ears in the box parts, and means at a subsequent position for inserting pintles in the hinge ears comprising a mandrel, means for placing the box parts on the mandrel and moving them back to the conveyor, a slide in the mandrel having a pintle abutment, means for intermittently grasping a continuous wire and feeding it in a straight line at an angle through one of the ears and into engagement with the abutment, fixed guides for directing the wire in this movement, a combined cutting and positioning element for cutting off a piece of wire to form a pintle and registering its cut end with the opposite ear, and means for moving said slide to insert the pintle in the last-named ear.

64. A box forming and assembling machine comprising a reciprocating longitudinal conveyor for a row of box parts, a stationary holder and means for moving box parts from the conveyor and placing them on the holder and pintle inserting means for inserting pintles into the box parts located on the holder, comprising a slide moving at an angle to the direction of movement of the conveyor, a transverse lug carried by the slide, an oscillating arm arranged to move in a plane substantially parallel to that of the conveyor movement, jaws carried by the arm and slidable laterally in relation to the slide lug, and means for oscillating the arm.

65. A box forming and assembling machine comprising a step-by-step longitudinal conveyor and mechanisms located at different positions along the conveyor for punching ventilating openings in a box part, and for forming a hinge member in the box part, and means for operating said mechanisms substantially simultaneously while box parts are stationary at different work positions.

66. A box forming and assembling machine comprising a step-by-step longitudinal conveyor and mechanisms located at different positions along the conveyor including means for punching ventilating openings in a box part, means for forming a hinge member in the box part and means for smoothing irregularities formed about the ventilating openings by the punching mechanism.

67. In a box part hinge forming and assembling machine, means for advancing a row of similar box parts by step-by-step movement, means for advancing a series of complemental box parts in a similar manner in substantially parallel and opposite relation to the parts of the first series, means at one work position for punching openings in the parts of one series, means at another position for simultaneously forming hinge members on two opposite complemental box parts, means at another position for inserting pintles in the box parts of one series, means at another position for stamping the parts of one series to smooth out irregularities formed in punching, means for moving the complemental box parts together and means for assembling the hinge members.

68. A box forming and assembling machine comprising a conveyor for moving box parts forward, and instrumentalities located at different positions along the conveyor including means for punching ventilating holes in the box parts, means for forming hinge ears in the box parts and means for stamping the box parts to flatten burrs about the ventilating openings.

69. A box forming and assembling machine comprising a conveyor for moving box parts forward step-by-step, and means for punching ventilating holes in the box parts, means for forming hinge ears in the box parts, means for stamping the box parts to flatten burrs about the ventilating openings, and means for connecting the hinge members formed on said box parts with hinge members of other box parts brought into association with the parts first mentioned.

70. A box forming and assembling machine comprising a conveyor for moving box parts forward step-by-step, and means for punching ventilating holes in the box parts, means for forming hinge ears in the box parts, means for inserting hinge pintles in the box parts, and means for stamping the box parts to flatten burrs about the ventilating openings.

71. A box forming and assembling machine comprising a conveyor for moving box parts forward step-by-step, and means for punching ventilating holes in the box parts, means for forming hinge ears in the box parts, means for inserting hinge pintles in the box parts, means for stamping the box parts to flatten burrs about the ventilating openings, and means for connecting the hinge members formed on said box parts with hinge members of other box parts brought into association with the parts first mentioned.

72. A box part hinge forming and assembling machine comprising means for inserting hinge pintles in box parts including a movable pintle abutment, means for stamping the box-parts at a subsequent work position, and means associated with the stamping means for moving said abutment.

73. A box part hinge forming and assembling machine comprising a longitudinal intermittent conveyor, punching means adjacent to the conveyor, pintle inserting means at a subsequent position, including an abutment slide, stamping means at another subsequent position of the conveyor, and means associated with the stamping means for moving said slide.

74. A box part hinge forming and assembling machine, comprising a longitudinal intermittent conveyor, punching means adjacent to the conveyor, pintle-socket forming means at a subsequent position of the conveyor, pintle inserting means at a subsequent position, including an abutment slide, stamping means at another subsequent position of the conveyor, and means associated with the stamping means for moving said slide.

75. A box part hinge forming and assembling machine comprising a reciprocating conveyor for a series of box parts, driving means, and a link between the driving means and the conveyor including two spring-connected members arranged to yield and interrupt the drive upon impedance of the conveyor.

76. A box forming and assembling machine comprising a reciprocating conveyor for a series of box parts, a driving arm, means for oscillating the arm, a link connecting the arm and the conveyor, and yieldable means incorporated in the link for releasing the connection between the arm and conveyor when conveyor movement is unduly obstructed.

77. A box forming and assembling machine, comprising a pair of substantially parallel reciprocating conveyors, rock arms connected to move together and each connected to one of the conveyors, a drive shaft and driving means connecting the shaft with one of the arms.

78. A box forming and assembling machine, comprising two substantially parallel reciprocating longitudinal conveyors, a transverse reciprocating conveyor to move box parts from one of the longitudinal conveyors to the other, and means for reciprocating all the conveyors simultaneously in properly timed relation to each other.

79. In an apparatus for hinging together a body member having a vertical wall and a cover member having a flange, means for providing the vertical wall with pintle ears, means for inserting a pintle in said pintle ears, means for turning the flange of the cover member away from and then towards said cover member, means for inserting said turned flange behind said pintle and means for closing said flange around said pintle.

80. In an apparatus for hinging together a body member having a vertical wall and a cover member having a flange, means for providing the vertical wall with pintle ears, means for inserting a pintle in said pintle ears, means for turning the flange of the cover member away from and then towards said cover member, means for connecting said turned flange to said pintle, means for bending the end of said turned flange downwardly and means for closing said bent end around said pintle.

Signed at Baltimore in the State of Maryland, this 13th day of November A. D. 1920.

OLE M. SVENDSEN.